United States Patent Office 3,318,710
Patented May 9, 1967

3,318,710
FLAVORING COMPOSITION CONTAINING SODIUM INOSINATE AND MONOSODIUM GLUTAMATE
Kinichiro Sakaguchi, Meguroku, Tokyo, and Masajiro Kibi and Akira Kuninaka, Choshishi, Chibaken, Japan, assignors to Yamasa Shoyu Kabushiki Kaisha (doing business as Yamasa Shoyu Co., Ltd.), Choshi, Japan, a Japanese corporation
No Drawing. Continuation of application Ser. No. 158,108, Dec. 8, 1961, now Patent No. 3,104,171, dated Sept. 17, 1963, which is a division of application Ser. No. 756,541, Aug. 22, 1958, now Patent No. 3,223,592. This application May 1, 1963, Ser. No. 277,126
The portion of the term of the patent subsequent to Sept. 17, 1980, has been disclaimed
1 Claim. (Cl. 99—140)

This invention relates to a process for producing the solution containing 5'-nucleotides (adenosin-5'-monophosphate, guanosine-5'-monophosphate, uridine-5'-monophosphate, cytidine-5'-monophosphate, inosine-5'-monophosphate, xanthosine-5'-monophosphate) from ribonucleic acid by microbial 5'-phosphodiesterase action, and to an application of the 5'-nucleotides as special seasonings. The object of this invention is to produce flavorous 5'-nucleotides, which were so far prepared generally only by organic synthesis or by extraction from tissues of various organisms such as mammalian muscle, economically and in good yield from ribonucleic acid, using the enzymes of microorganisms.

This is a continuation of copending application Ser. No. 158,108, filed Dec. 8, 1961, now U.S. Patent 3,104,-171, which is a division of copending application Ser. No. 756,541, filed Aug. 22, 1958, now U.S. Patent 3,223,592.

Chemical degradation of ribonucleic acid results in formation of 3'- and 2'-nucleotides and does not result in formation of 5'-nucleotides. Furthermore general ribonucleodepolymerases, without distinction of the kind of origins, degrade ribonucleic acid into 3' (or 2')-nucleotides but not into 5'-nucleotides. Only so-called unspecific phosphodiesterases from snake venom or intestinal mucosa degrade ribonucleic acid into 5'-nucleotides. However, it is very difficult to obtain a large amount of these enzymes. 5'-nucleotides can be produced by means of organic synthesis but said process is very troublesome and not economical too. Thus, hitherto, the production of 5'-nucleotides was very difficult, and especially economical mass production thereof was quite impossible.

We have found that some strains of bacteria, yeasts, and molds contain 5'-phosphodiesterases which specifically hydrolyze the 5'-phosphodiester linkages

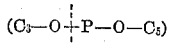

in ribonucleic acid and produce four 5'-nucleotides: adenosine-5'-monophosphate, guanosine - 5' - monophosphate, cytidine-5'-monophosphate, and uridine-5'-monophosphate. Especially the several strains which belong to the following genuses have been recognized to contain strong 5' - phosphodiesterase: Bacillus, Streptomyces, Torula, Zygosaccharomyces, Penicillium and Aspergillus. Thus the basis of the production of 5'-nucleotides by microorganisms according to the present invention has been established for the first time.

This invention has been accomplished on the basis of the above confirmation. Therefore, the present invention provides a process for the production of 5'-nucleotides which is characterized in that this ribonucleic acid is degraded into 5'-nucleotides by 5'-phosphodiesterase which is contained in living cells, dry cells, culture filtrates or cell extracts of microorganisms described above. The microorganisms containing 5'-phosphodiesterase are able to be grown on either solid media or liquid media. For economical mass production, however, liquid media are more appropriate. As the components of the culture medium, the conventional carbon and nitrogen sources and several inorganic salts may be employed effectively. This invention includes both one step method and two step method. In one step method, both growing of microorganism and enzymic degradation of ribonucleic acid are carried out simultaneously, employing culture medium containing ribonucleic acid. In two step method, growing of microorganism and enzymic degradation of ribonucleic acid are carried out separately.

According to the present invention, it is not necessary to purify ribonucleic acid before its enzymic degradation. Crude solution containing ribonucleic acid, such as yeast extracts, may be used as an appropriate starting material. Furthermore microbial cells cultivated for producing 5'-phosphodiesterase are effectively utilized too as a source of ribonucleic acid.

Free 5'-nucleotides or their alkali salts obtained by the processing as described above enhance or increase the flavor of the foods, beverages, and seasonings in which they are placed. This flavoring action is caused by the synergy between 5'-nucleotides and amino acids or organic acids. According to our discovery, purine and pyrimidine bases, their nucleosides, and their 2'- and 3'-nucleotides have little flavor, while 5'-nucleotides, especially inosine-5'-monophosphate, guanosine - 5' - monophosphate, and xanthosine-5'-monophosphate, have very agreeable good taste. Furthermore, there is specific synergy in taste between 5'-nucleotides and amino acids or organic acids. Among various amino acids, glutamic and aspartic acids were recognized to be especially effective in the synergy with 5'-nucleotides. General foods, beverages, and seasonings contain considerable quantity of amino acids or organic acids as main flavoring components, but scarcely contain 5'-nucleotides. Therefore, it seems that the role of 5'-nucleotides in flavoring is very important. For example, the good taste of soups or meat extracts, containing small quantity of 5'-nucleotides, may be perhaps caused mainly by the synergy between 5'-nucleotides and amino acids.

This invention relates also to the application of 5'-nucleotides based on the utilization of aforesaid synergy between 5'-nucleotides and amino acids or organic acids. The application of 5'-nucleotides according to the present invention comprises adding one or more of 5'-nucleotides to general foods or beverages such as meat products, soups, "roux," vinegar, various dressings, sauces, curry powder and various drinks including wine, to counteract the displeased pungency which spoils the taste qualities of foods or beverages, and to enhance or increase the flavor specifically according to the synergy between 5'-nucleotides and amino acids or organic acids present in the foods or beverages. In case of application for the foods or beverages containing no amino acids, it is more effective to add monosodium glutamic acid and 5'-nucleotides together. 5'-nucleotides may be also employed to enrich specifically the seasonings containing amino acids. The bitter substances in the crude preparations of 5'-nucleotides can be readily removed by cation exchange resin. Both crude and purified preparations of 5'-nucleotides are useful.

According to the present invention, alkali salts of 5'-nucleotides may be also employed similarly as free 5'-nucleotides since there is no significant difference between their flavoring action.

The invention is illustrated but not limited by the following examples.

Example 1

50 ml. of an aqueous culture medium containing 5% of glucose, 0.5% of polypeptone, 0.05% of monobasic potassium phosphate, 0.05% of dibasic potassium phosphate, 0.04% of magnesium sulfate, and 0.04% of calcium chloride were sterilized and inoculated with a pure culture of Penicillium citrinum. After surface culture at 30° C. for five days the mycelial deck was separated from the culture broth, and washed with sterilized water. The washed mycelial deck was incubated with 50 ml. of 0.5% yeast ribonucleic acid solution containing 0.01 N sodium fluoride at 30° C. After 22.5 hours the deck was removed. The resulting reaction mixture was recognized to contain 70–80 mg. of mononucleotides, 80–90 mg. of nucleosides, and 70–80 mg. of undepolymerized polynucleotides. The mononucleotides, which are contained in above mixture, were identified as cytidine-5'-monophosphate, adenosine-5'-monophosphate, inosine-5'-monophosphate, uridine-5'-monophosphate, and guanosine-5'-monophosphate. The identification was carried out as follows: 23 ml. of the reaction mixture were adjusted to pH 8.5 with strong sodium hydroxide solution. 2.5 ml. of 20% barium acetate solution were added thereto. The precipitate of barium phosphate formed was removed. The supernatant was adjusted to pH 5.0 with a small quantity of acetic acid. 1 ml. of mercuric acetate solution (20% in 2% acetic acid) was added. The precipitate was centrifuged, washed and suspended in water. Into the suspension hydrogen sulfide gas was introduced to separate nucleotides. The mixture was filtered and the precipitate was washed with hot water. The solution resulting from the washing was combined with the supernatant and a portion of the combined solutions was adjusted to pH 8.5, and charged into anion exchange resin Dowex 1-Cl-X-4 (200–400 mesh) column with a diameter of 1.0 cm. and 23 cm. in height, and was eluted with 0.003 N (No. 1–No. 216 test tubes) and 0.010 N hydrogen chloride (No. 217–No. 302 test tubes). Each 80 drops of the eluate were collected into a test tube and optical density at 260 m$\mu$ of each eluate was read. Five ultraviolet absorbing fractions A, B, C, D and E were obtained. The properties of these fractions are tabulated as follows:

the formation of xanthosine-5'-monophosphate was not recognized. However, this compound was easily obtained enzymatically or chemically from guanosine-5'-monophosphate.

Example 2

For the formation of the strong 5'-phosphodiesterase, shaking culture is more effective than surface cluture at least in case of the strain employed in Example 1.

The culture medium employed in Example 1 was inoculated with Penicillium citrinum. The inoculated growth medium was shaken on a reciprocating shaker at 30° C. After 7 days culture filtrates were concentrated in vacuo, and then dialyzed against running water over night. To the dialyzed solution 4 volumes of ethanol were added. The resulting precipitate, which was rich in 5'-phosphodiesterase activity, was dried up in a desiccator and was employed as an enzyme preparation. From 1 litre of culture filtrates about 1 g. of the preparation was obtained. 1 g. of this preparation was incubated with 200 ml. of 5% ribonucleic acid at 65° C. and pH 5.0. Under these conditions phosphomonoesterase and adenyl deaminase were almost inactive, while 5'-phosphodiesterase was recognized to be very active.

The reaction proceeds as described below:

| Incubation time (min.) | 0 | 10 | 30 | 60 | 90 |
|---|---|---|---|---|---|
| 5'-nucleotides formation from ribonucleic acid (percent) | 0 | 27 | 68 | 96 | 97 |
| Inorg. P. formation from 5'-nucleotides (percent) | 0 | 3.0 | 3.5 | 4.5 | 5.7 |

In the reaction mixture adenosine-5'-monophosphate, guanosine-5'-monophosphate, cytidine-5'-monophosphate and uridine-5'-monophosphate were recognized to be accumulated. 5'-nucleotides accumulated were purified by conventional means. The yield of each 5'-nucleotide is 1300–2000 mg. in free form. Adenosine-5'-monophosphate was able to be transformed to inosine-5'-monophosphate chemically or enzymatically.

| | Nucleotide fraction obtained | | | | | Standard substance | | | | | | |
|---|---|---|---|---|---|---|---|---|---|---|---|---|
| Fraction | A | B | C | D | E | Cytidine-3'-monophosphate | Adenosine-3'-monophosphate | Adenosine-5'-monophosphate | Inosine-5'-monophosphate | Uridine-3'-monophosphate | Guanosine-3'-monophosphate | Mixture of 3'-nucleotides |
| No. of test tube | 21–24 | 43–54 | 121–122 | 221–237 | 264–281 | | | | | | | |
| $\lambda_{max}$(m$\mu$)[1] | 275 | 258 | 249 | 262 | 257 | 278 | 257 | 257 | 250 | 262 | 257 | 258 |
| Percent color development[2] (pentoseorcinal reaction): | | | | | | | | | | | | |
| 7 min | | 78.7 | 82.2 | | 81.6 | | | | 80.4 | | 42.5 | 39.6 |
| 15 min | | 94.2 | 98.9 | | 97.2 | | | | 95.7 | | 80.2 | 72.8 |
| 25 min | | 100.0 | 100.0 | | 100.0 | | | | 100.0 | | 98.3 | 94.7 |
| 35 min | | 96.0 | 96.8 | | 96.3 | | | | 95.4 | | 100.0 | 99.0 |
| 45 min | | 93.9 | 92.6 | | 92.8 | | | | 92.1 | | 99.1 | 100.0 |
| Carbasole reaction | | blue | blue | | blue | | purple | blue | blue | | purple | purple |
| Distance[3] migrated from origin to anode side by electrophoresis (cm.) | 4.9 | 4.9 | 12.5 | 14.7 | 7.7 | 4.9 | 5.0 | 4.5 | 12.5 | 15.0 | 8.8 | 14.8, 8.7, 4.7 |
| NaIO$_4$-rosaniline reaction | + | + | + | + | + | − | − | + | + | − | − | − |

[1] Ultraviolet absorption spectra of standard substances were measured in 0.1 N HCl.
[2] The technique employed was essentially the same as that described by Albaum and Umbreit (J. Biol. Chem., 167, 369, (1947)).
[3] Starting line was at 5 cm. from the end on the cathode side, and 26 cm. from the end on the anode side.

The results shown in the table indicate that the ultraviolet absorbing substances which are contained in fractions A, B, C, D and E are cytidine-5'-monophosphate, adenosine-5'-monophosphate, inosine-5'-monophosphate, uridine-5'-monophosphate, and guanosine-5'-monophosphate, respectively. It seems very probable that inosine-5'-monophosphate recognized in this example was produced secondarily from adenosine-5'-monophosphate by the action of Penicillium deaminase. In this example

Example 3

100–500 mg. of the crude mixture of adenosine-5'-monophosphate, guanosine-5'-monophosphate, cytidine-5'-monophosphate, and uridine-5'-monophosphate obtained in Example 2 were added to 1 litre of sauce. (Practically, 2–10 ml. of reaction mixture were employed against 1 litre of sauce.) By this treatment displeased pungency of sauce was counteracted perfectly, and the good flavor was greatly increased. Thus the sauce became flavorous almost beyond recognition. The mixture of deaminated 5′-nucleotides containing inosine-5′-monophosphate, xanthosine - 5′ - monophosphate, and uridine-5′-monophosphate, was also employed to improve the taste of sauce. The mixture of 5′-nucleotides was able to be kept in a form of dry powder for a long time.

*Example 4*

Monosodium glutamate was coated with purified inosine-5′-monophosphate disodium salt or guanosine-5′-monophosphoric acid. The ratio of monosodium glutamate to inosine-5′-monophosphate or guanosine-5′-monophosphate was 5–15:1. The resultant superior seasoning was recognized to have remarkable flavoring properties for all kind of dishes.

*Example 5*

To 120 g. of soup potage powder (corresponding to 1800 ml. of final volume) 1 to 2 g. of purified inosine-5′-monophosphate disodium salt or guanosine-5′-monophosphoric acid were added. From the resultant enriched powder, remarkable flavorous soup was prepared. Instead of the purified nucleotide preparations each crude preparation or mixture of 5′-nucleotides was also employed satisfactorily.

In case of soup consomme being prepared inosine-5′-monophosphate, guanosine-5′-monophosphate, and mixture of 5′-nucleotides were employed effectively too.

What is claimed is:

A flavoring composition including as the active flavoring agent a mixture of sodium inosinate and monosodium glutamate, said mixture consisting essentially of 100 parts by weight of said monosodium salt and about six to twenty parts by weight of said sodium inosinate.

References Cited by the Examiner
UNITED STATES PATENTS
3,104,171    9/1963    Sakaguchi et al. _____ 195—31

A. LOUIS MONACELL, *Primary Examiner.*

A. E. TANENHOLTZ, *Assistant Examiner.*